United States Patent
Wang et al.

(10) Patent No.: US 7,813,926 B2
(45) Date of Patent: Oct. 12, 2010

(54) TRAINING SYSTEM FOR A SPEECH RECOGNITION APPLICATION

(75) Inventors: Ye-Yi Wang, Redmond, WA (US); John Sie Yuen Lee, Cambridge, MA (US); Alex Acero, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1109 days.

(21) Appl. No.: 11/376,853

(22) Filed: Mar. 16, 2006

(65) Prior Publication Data

US 2007/0219798 A1      Sep. 20, 2007

(51) Int. Cl.
G10L 15/00 (2006.01)
G10L 15/06 (2006.01)
G10L 15/18 (2006.01)

(52) U.S. Cl. .................. 704/245; 704/243; 704/244; 704/257

(58) Field of Classification Search .......... 704/243–245
See application file for complete search history.

(56) References Cited

U.S. PATENT DOCUMENTS 5,960,397 A * 9/1999 Rahim .................. 704/244

2003/0212543 A1 * 11/2003 Epstein et al. .......... 704/9
2007/0156392 A1 * 7/2007 Balchandran et al. ........ 704/9

OTHER PUBLICATIONS

"Unsupervised Language Model Adaptation" by Bacchiani et al., AT&T Labs-Research, IEEE 2003, pp. I-224 through I-227.
Wang et al., "Speech Utterance Classification Model Training Without Manual Transcriptions", Proc. ICASSP 2006, Toulouse, France, May 2006; pp. I-553-I-556.

* cited by examiner

Primary Examiner—David R Hudspeth
Assistant Examiner—Justin W Rider
(74) Attorney, Agent, or Firm—Joseph R. Kelly; Westman, Champlin & Kelly, P.A.

(57) ABSTRACT

A training system for a speech recognition application is disclosed. In embodiments described, the training system is used to train a classification model or language model. The classification model is trained using an adaptive language model generated by an iterative training process. In embodiments described, the training data is recognized by the speech recognition component and the recognized text is used to create the adaptive language model which is used for speech recognition in a following training iteration.

21 Claims, 6 Drawing Sheets

TRAINING SYSTEM FOR A SPEECH RECOGNITION APPLICATION

BACKGROUND

Speech recognition applications, such as call routing applications are used to execute commands in response to an input of natural speech utterance. Such applications invoke a speech recognition component that provides an output text or recognition for the input speech utterance. The output text is provided to a classifier which uses a classification model to output a class destination that is used by the application to execute the command in response to the input speech utterance.

For example for a call routing application, if the user utters "I want to talk to a customer representative" in response to an application prompt, the input utterance is recognized by the speech recognition component and the recognized text is provided to the classifier to route the call or inquiry to the customer service department based upon the classification model of the call routing application.

Classification models for speech or call routing applications are developed using domain-specific training data. The training data used in the development process includes speech utterances as well as manually transcribed text and class annotations (for the classification destinations) corresponding to each of the speech utterances. Manual transcription of the speech utterances is provided for example, by live agents that provide text recognition for each training utterance. Manually transcribing speech utterances for a large volume of speech training data is burdensome and increases development expense for call routing or other speech applications.

The discussion above is merely provided for general background information and is not intended to be used as an aid in determining the scope of the claimed subject matter.

SUMMARY

The application discloses a training system for developing a language model and classification model for a speech application. In embodiments described, the training system generates an adaptive language model using an iterative training process. In the iterative training process described, speech utterances from multiple sets of training data are recognized in multiple training iterations. An adaptive language model is created for each iteration and used for speech recognition in a following training iteration.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
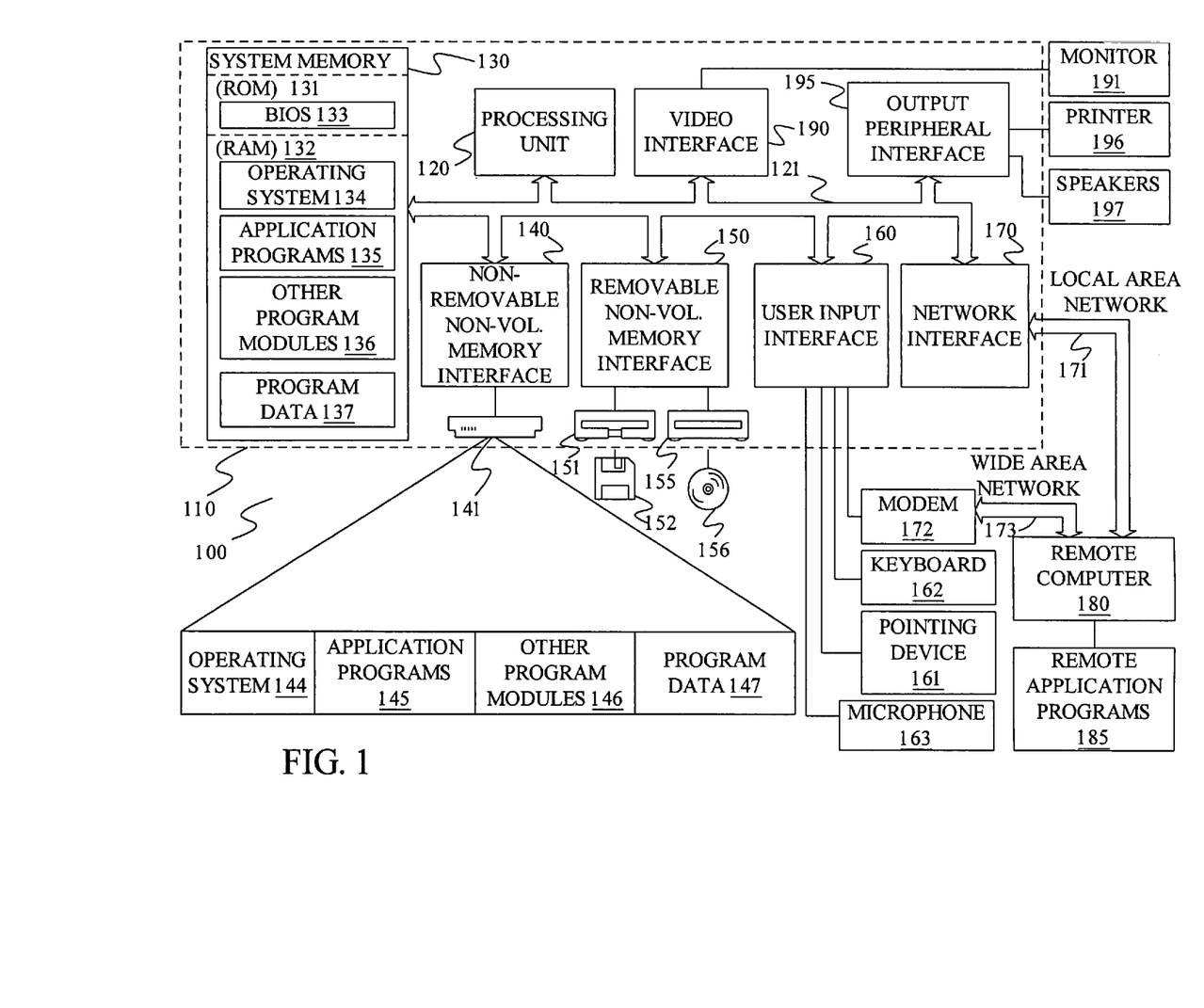
FIG. 1 is a block diagram of a computing environment in which embodiments described herein can be implemented.

FIG. 1 illustrates a suitable computing system environment 100 for embodiments of the training and speech applications described herein. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

Embodiments are operational with numerous other general purposes or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing some embodiments includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC; a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
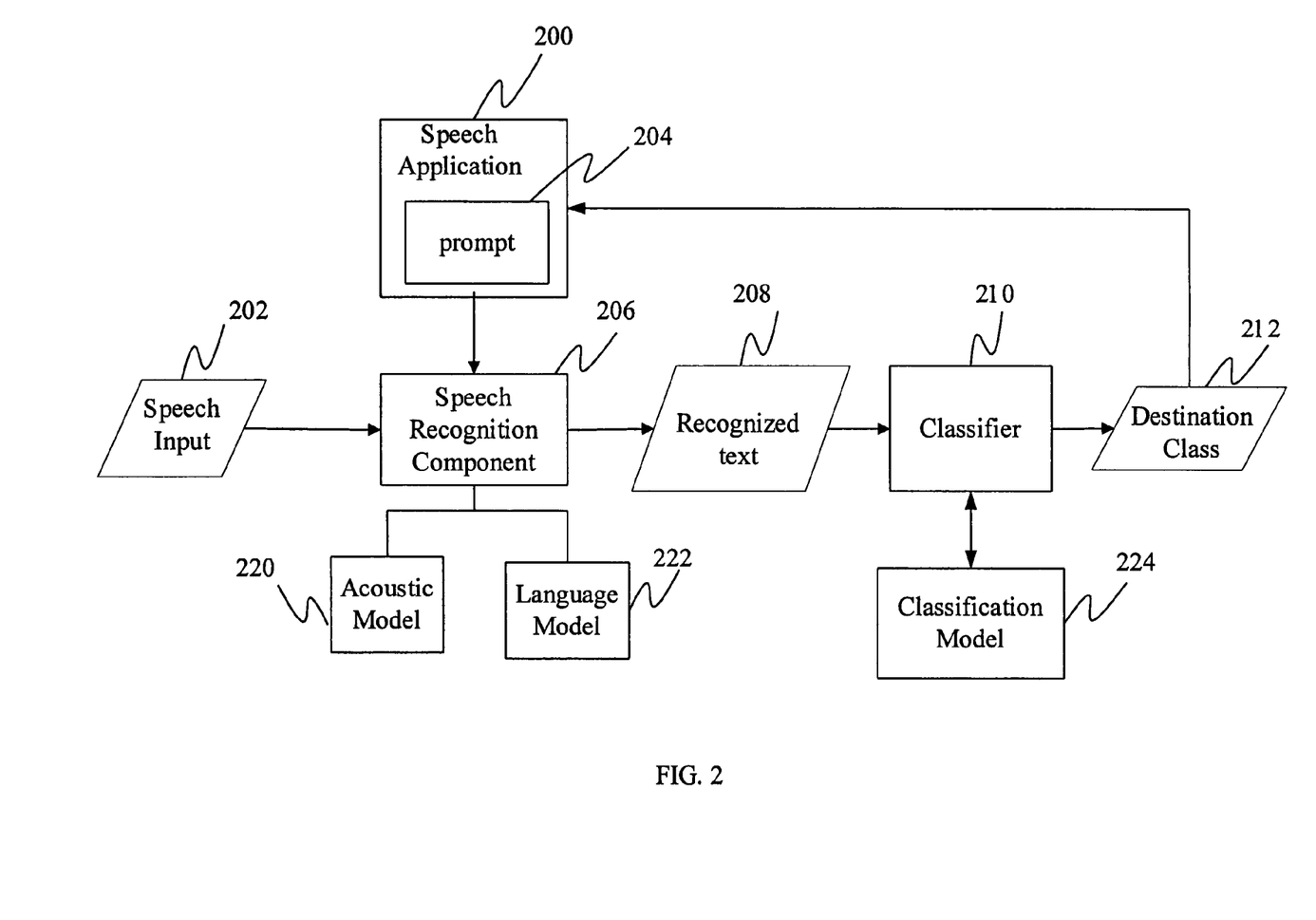
FIG. 2 is a block diagram illustrating an embodiment of a speech recognition application.

The present application describes a training system of a speech application 200, such as a call routing application. FIG. 2 illustrates an embodiment of the speech application 200 that is trained using techniques or systems described in the present application. As shown in FIG. 2, the speech application 200 invokes a speech recognition component 206 to recognize speech input or utterances 202 provided in response to an application prompt or query 204. The speech recognition component 206 receives the input speech utterance 202 and outputs recognized text 208. The application 200 also invokes a classifier 210 which receives the recognized text 208 and outputs a destination class 212 that is used by the application 200 to execute the command uttered by a user.

The speech recognition component 206 and its detailed operation can vary widely without departing from the scope of the present system. The speech recognition component 206 uses models which illustratively include an acoustic model 220 and a language model 222. The classifier 210 uses a classification model 224 such as a maximum entropy classification model for determining the proper class destination for the recognized text 208 provided by the speech recognition component 206.

Thus in an illustrative example, the application may prompt a user with "How may I direct your call". In response to the prompt 204, the user utters "I'd like to talk to a service representative please". The utterance "I'd like to talk to a service representative please" is recognized by the speech recognition component 206. The recognized text 208 is then provided to the classifier 210 to provide the destination class 212 for the application 200 to transfer the call to the customer service department. The language model 222 and classification model 224 are typically trained using domain-specific training data prior to implementation in the speech application 200.

Figure 3:
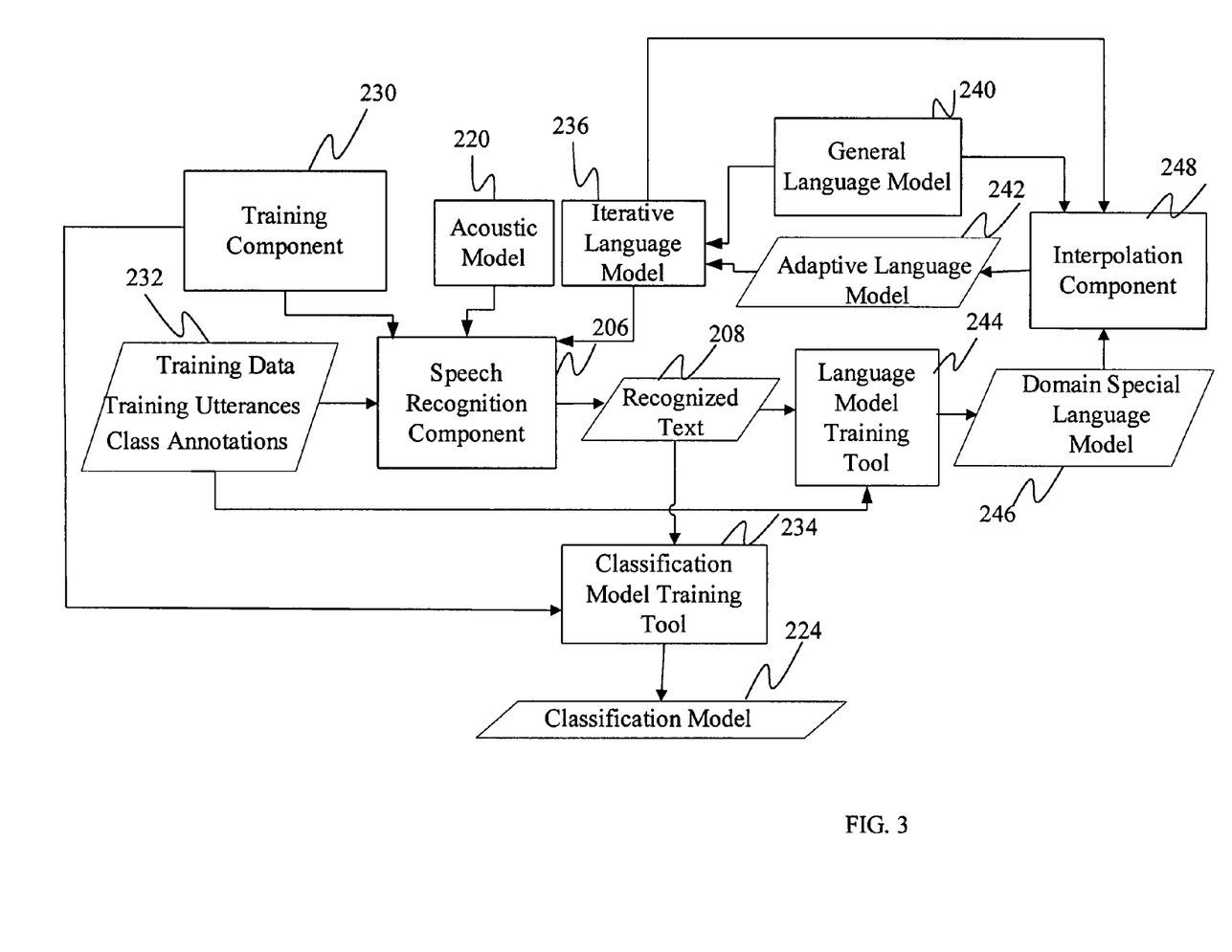
FIG. 3 is a block diagram illustrating an embodiment of a training application for the speech application of FIG. 2.

FIG. 3 illustrates an embodiment of a training component 230 for training the classification model 224 of FIG. 2 where like numbers are used to identify like parts in the previous FIG. The training component 230 invokes the speech recognition component 206 which receives input training data 232 and outputs recognized text 208 for the input training utterances of the training data 232. The recognized text 208 is provided to a classification model training tool 234 which uses the training utterances and class annotations from the training data 232 to generate the classification model 224. The speech utterances and class annotations of the training data are collected using known data collection or deployment system. An example data collection system is a Wizard-of-Oz data collection system in which a wizard interacts with the user on behalf of an automated system by choosing a destination class after hearing the user's utterance.

As shown, the speech recognition component 206 uses the acoustic model 220 and iterative language model 236 for speech recognition. The iterative language model 236 is developed over multiple training iterations to provide a more accurate domain-specific language model for speech recognition. Initially or in a first iteration, a general language model 240 is designated as the iterative language model 236. In subsequent iterations, an adaptive language model 242 defines the iterative language model 236 for speech recognition. The adaptive language model can be generated using supervised or unsupervised adaptation.

The unsupervised adaptive language model 242 is generated based upon recognition from multiple training iterations using a language model training tool 244. The language model training tool 244 receives recognized text 208 from the speech recognition component 206 as well as training utterances for a particular training iteration and outputs a domain-specific language model 246 based upon the recognized text for the particular iteration.

The domain-specific language model 246 and general language model 240 are provided to an interpolation component 248 to generate the adaptive language model 242 for the training iteration. The adaptive language model 242 is designated as the iterative language model 236 for a following training iteration to provide automated language model adaptation. Use of the adaptive language model 242 for subsequent training iterations provides a more accurate domain-specific language model with broad coverage to enhance spoken language classification of the training data over multiple iterations.

In the illustrated embodiment the classification model 224 is generated using the adaptive language model 242 for speech recognition without manual transcription of the training utterances. The classification model 224 is generated without manual transcription since recognition from the speech recognition component 206 iteratively improves with development of the adaptive language model 242, which enables the classification model trained with automatic transcription to achieve the same level of accuracy as the one trained with manual transcription. Eliminating the step of manual transcription of the training utterances simplifies the training process for the classification model 224.

Figure 4:
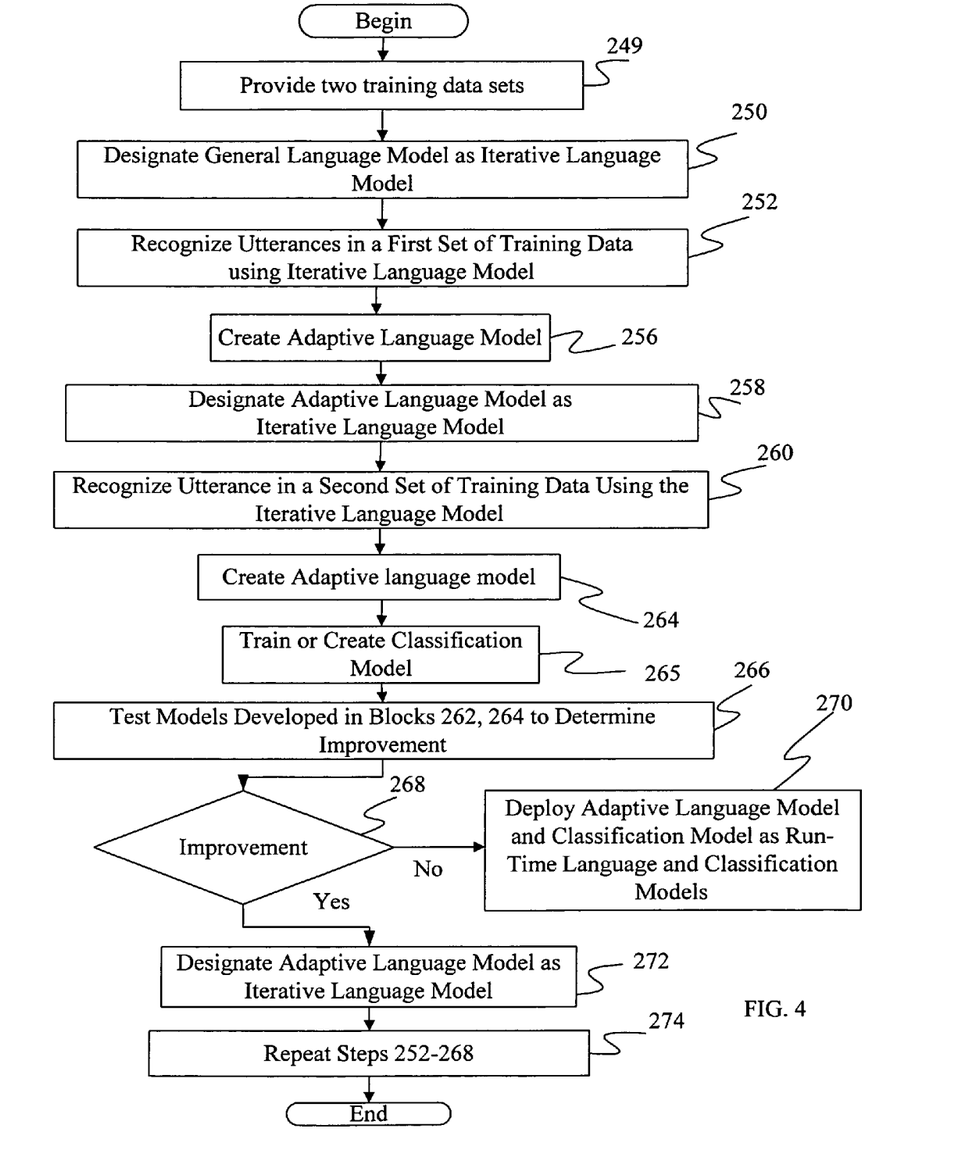
FIG. 4 is a flow chart illustrating steps for training a classification model for a speech application illustrated in FIG. 2.

FIG. 4 illustrates steps for implementing multiple iterations of the training component 230 of FIG. 3 to generate the classification and language models for the speech application 200. In the illustrated embodiment, the training component 230 uses two training data sets including a first training data set and a second training data set. As shown in step 249, the training utterances are partitioned into the two disjoint training data sets. In steps 250 and 252, the general language model 240 is designated as the iterative language model 236 and the input training utterances in the first training data set are recognized using the iterative language model 236 to provide the recognized text 208. In step 256, an adaptive language model 242 is created using the output text recognitions 208 for the training data.

The adaptive language model 242 generated in step 256 is designated as the iterative language model in step 258 for a subsequent training iteration using the second set of training data. In step 260, training utterances from the second set of training data are recognized as previously described. In step 264, an adaptive language model 242 is created using the recognized text of step 260. The recognized texts from steps 252 and 260 are used to train a classification model in step 265. In step 266, the language and classification models created in step 264 and 265 are tested with a held-out cross-validation set to determine improvement as illustrated in step 268 over the prior iteration.

If there is no improvement, the training component 230 does not perform any further training iterations and the iterative language model and classification model are deployed as a run-time language model and classification model for the speech application 200 as illustrated by block 270.

If there is improvement, the adaptive language model of block 264 is designated as the iterative language model in step 272 and the process of steps 252-268 is repeated as illustrated by block 274.

In the illustrated embodiment of FIG. 4, the training component 230 uses two training data sets to iteratively develop models for the speech application 200 illustrated in FIG. 2. The training component 230 implements multiple iterations of unsupervised language model cross adaptation, in which the recognition of one training set is used to build an adaptive languages model for the recognition of the other set.

Table I illustrates cross training iterations of blocks 252-274 for two training data sets (Set 1 and Set 2).

TABLE I

| Iteration | Training Data Set | Iterative Language Model | Adaptive language model |
|---|---|---|---|
| 1 | Set 1 | GLM | LM1 |
| 2 | Set 2 | LM1 | LM2 |
| 3 | Set 1 | LM2 | LM3 |
| 4 | Set 2 | LM3 | LM4 |

As illustrated in Table 1, utterances of the training data (set 1) are recognized using the general language model GLM and the recognized text is used to generate the adaptive language model LM1 in a first iteration. In a second iteration, the training data of set 2 is recognized using LM1 of the first iteration and the recognized text is used to generate adaptive language model LM2. In iteration step 3, recognition of the training utterances of set 1 is repeated using adaptive language model LM2 generated in iteration 2. In iteration 4, recognition of the training set 2 is repeated using adaptive language model LM3 created based upon training data set 1 in iteration 3.

In the illustrated sequence, the repeated or cross recognition of set 1 improves recognition and model development.

Table II below illustrates language model development based upon cross training recognition of the training data sets of Table I.

TABLE II

| Iteration (Set No.) | Utterance | Iterative Language Model | Text | Adaptive Language Model |
|---|---|---|---|---|
| 1 (Set 1) | ... "flight" ... | GLM | ... floyd ... | LM1 |
| 2 (Set 2) | ... "flight" ... | LM1 | ... flight ... | LM2 |
| 3 (Set 1) | ... "flight" ... | LM2 | ... flight ... | LM3 |
| 4 (Set 2) | ... "flight" ... | LM3 | ... flight ... | LM4 |

As shown in Table II, the training data sets 1 and 2 include the speech utterance that contains the word "flight". In a first iteration, "flight" is misrecognized as Floyd and the adaptive language model LM1 includes Floyd corresponding to the training utterance. If this language model is used to recognize set 1 again, there is little hope that it will correct the mistake because the newer language model LM1 will increase the probability of seeing "floyd" in the same context. This error-reinforcement is less harmful if LM1 is used to recognize set 2 in a second iteration, where the word "flight" may occur in a different n-gram context and can be properly recognized, so the adaptive language model LM2 will boost the probability for "flight".

Since recognition of set 1 is repeated using the adaptive language model LM2, with boosted probability for the word "flight", the "flight" utterance in data set 1 in iteration 3 is recognized as flight and not Floyd. Thus, the adaptive language model LM3 is generated based upon a correct recognition of the speech utterance "flight" to improve language model development.

Figure 5:
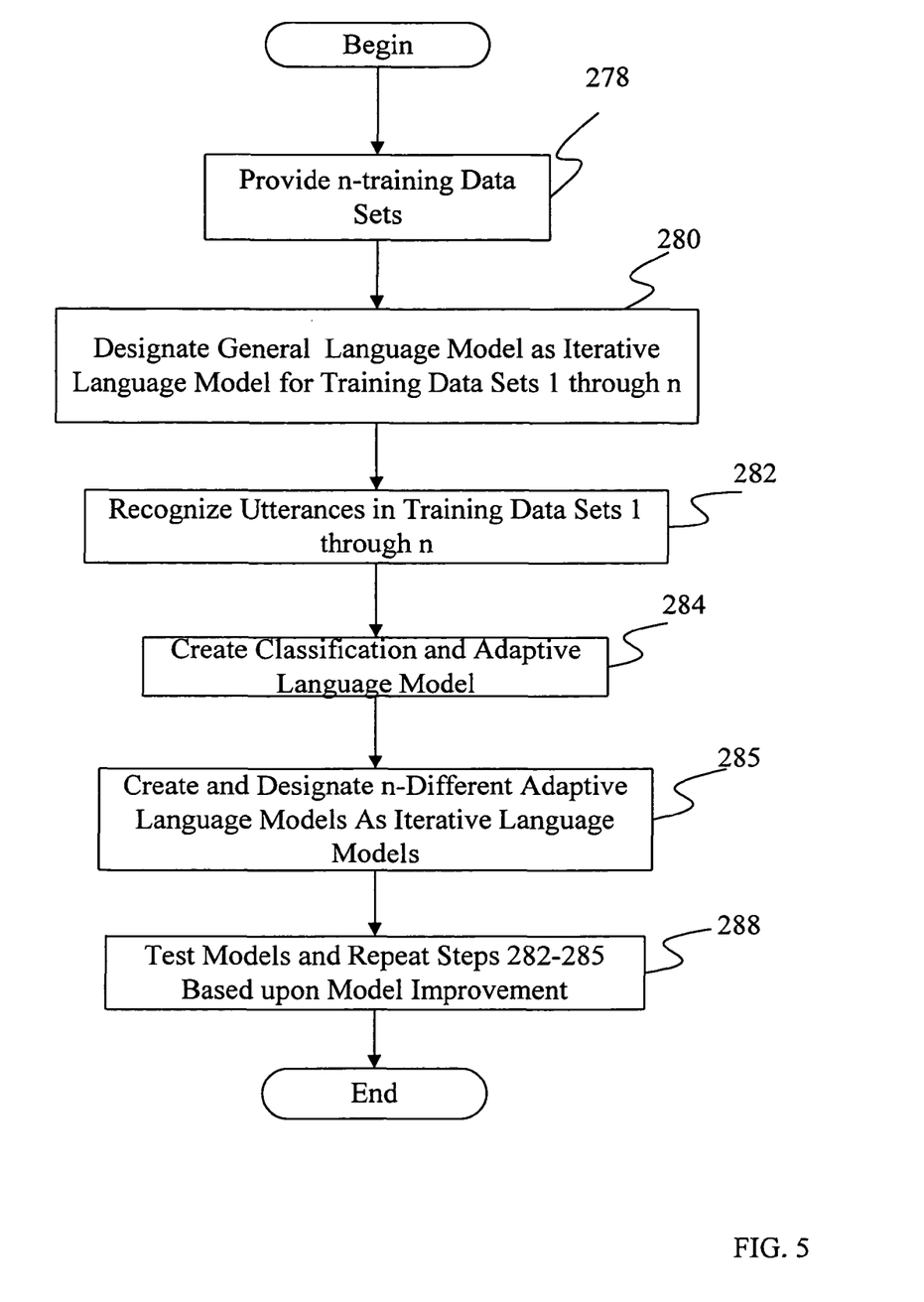
FIG. 5 is a flow chart illustrating iteration steps for n-training data sets.

The two-fold cross-validation embodiment illustrated in FIG. 4 can be generalized into an n-fold cross-validation mechanism, as shown in the flow chart of FIG. 5, where the training utterances are partitioned into n-disjoint sets, where n is the number of training sets, as shown in step 278. Initially, as illustrated by step 280, the general language model 240 is designated as the iterative language model for training data sets 1 through n. Utterances in training data sets 1 through n are recognized using the iterative language model (i.e. general language model) in step 282.

Following recognition of training data sets 1 through n, a classification model and adaptive language model for testing and/or cross-validation are created in step 284 using the classification model training tool 234 and the language model training tool 244 as previously described, based on the recognition of the utterances in training data set 1 through n.

In step 285, n different adaptive language models are created and designated as the iterative language models for the n-training data sets. The adaptive language model for training data set k, where k is one of the training data sets 1-*n*, is created by first training a domain-specific language model with the recognitions of the n−1 training sets (all but training set k) obtained in step 282, and then interpolating the domain-specific language models with the general language model. The n-different adaptive language models created are designated as the iterative language model for the n training data sets for recognition in a subsequent iteration.

As previously described, the classification model and adaptive language model trained using recognitions from step 282 with all the n training data sets are tested and steps 282-285 are repeated as shown in block 288 until the cross-validation shows no improvement.

Table III below illustrates an iteration sequence for n=3 training data sets.

TABLE III

| n-Training Data Sets | | Iterative Language Model | N Different Adaptive Language Models |
|---|---|---|---|
| Iteration 1 | Set 1 | GLM | LM1-23 |
| | Set 2 | GLM | LM1-13 |
| | Set 3 | GLM | LM1-12 |
| Iteration 2 | Set 1 | LM1-23 | LM2-23 |
| | Set 2 | LM1-13 | LM2-13 |
| | Set 3 | LM1-12 | LM2-12 |
| Iteration 3 | Set 1 | LM2-23 | LM3-23 |
| | Set 2 | LM2-13 | LM3-13 |
| | Set 3 | LM2-12 | LM3-12 |

As shown in Table III, in iteration 1, the utterances from all three training sets are recognized using the general language model 240. The recognized text is used to create adaptive language models LM1_23 (trained with recognitions of training set 2 and 3 and then interpolated with the general language model), LM1_13 (trained with recognitions of training set 1 and 3 and then interpolated with the general language model) and LM1_12 (trained with recognitions of training set 1 and 2 and then interpolated with the general language model.) In iterations 2, adaptive language models LM1-23, LM1-13, LM1-12 are designated as the iterative language model 236 used for recognition of training data sets 1-3, respectively.

Figure 6:
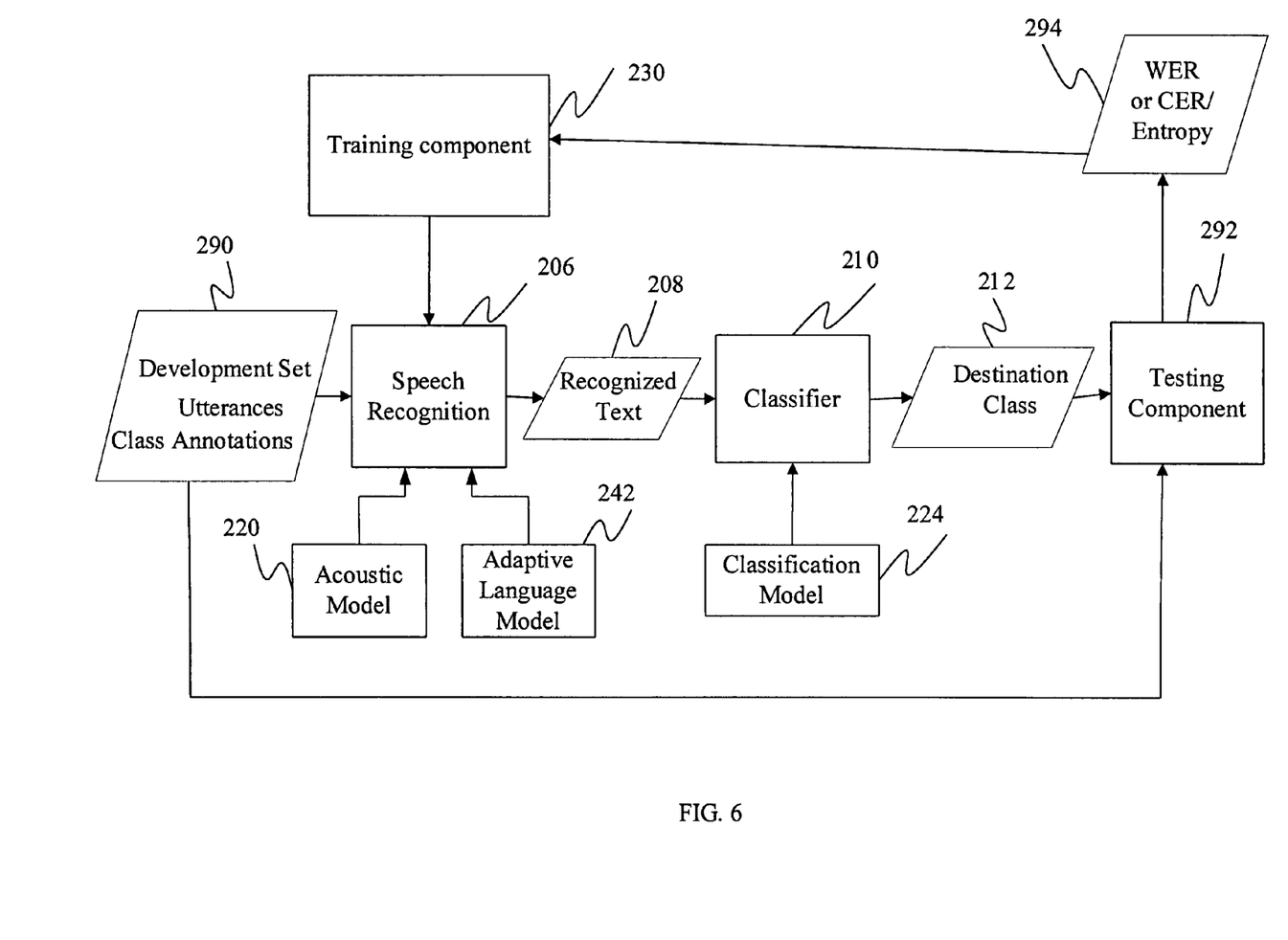
FIG. 6 illustrates a testing system to evaluate improvement between multiple training iterations.

As previously illustrated in FIG. 4, iterations are repeated as long as recognition or classification development improves over the prior iteration on a held-out cross-validation (development) data set as illustrated in block 290 of FIG. 6.

As shown in FIG. 6 the development data set 290 is used to evaluate model improvement between training iterations. In FIG. 6, the development data set includes speech and class annotations for speech utterances. Additionally, the development set 290 can include text transcriptions for speech utterances. Following training iterations as illustrated by block 266 in FIG. 4 and block 288 in FIG. 5, the training component 230 invokes the speech recognition component 206 to recognize the development set utterances using the adaptive language model 236 generated based upon the training data 232 of the training iterations. The classifier 210 receives the recognized text 208 and outputs a destination class 212 using the classification model 224 generated by the training data 232 for the training iterations.

Depending on the purpose of recognition, the output text 208 or destination class 212 are provided to a testing component 292 to determine model improvement based upon the text and class annotations corresponding to the development utterances. If the purpose of recognition is automatic transcription, a word error rate (WER) is obtained by comparing the recognition result with the transcription; if the purpose of recognition is call routing, the classifier's output is compared with the annotated destination class to obtain a classification error rate (CER).

In the illustrated embodiment of FIG. 6, the testing component 292 outputs the word-error-rate (WER) and the classification-error-rate (CER) 294 for the adaptive language model 242 and classification model 224 of the current iterations. The WER and/or CER of the current iterations are compared to the WER and/or CER of the previous iterations to evaluate development improvement which as previously described is used to determine whether to pursue further training iterations as previously described with respect to FIG. 4 and FIG. 5.

Table IV below illustrates WER and CER for recognition (Test WER) and classification (Test CER) of the test data using the adaptive language model and classification model generated by training data of two training data sets—set S1 and set S2 for training iterations 1-8. The cross-validation according to the CER of the development set 290 reveals no improvement beyond the model created in iteration 4.

TABLE IV

| Iteration | Train WER | Test WER | Test CER |
|---|---|---|---|
| 1 (Set 1) | 10.76% | 10.06% | 5.58% |
| 2 (Set 2) | 11.03% | 10.25% | 5.24% |
| 3 (Set 1) | 11.15% | 10.49% | 5.03% |
| 4 (Set 2) | 11.16% | 10.36% | 4.92% |
| 5 (Set 1) | 11.17% | 10.41% | 4.92% |
| 6 (Set 2) | 11.15% | 10.40% | 4.81% |
| 7 (Set 1) | 11.14% | 10.41% | 5.25% |
| 8 (Set 2) | 11.17% | 10.35% | 5.14% |

As shown in Table IV above, the best CER for the test set is achieved based upon the classification and language models of iteration 6, which is slightly better than the model in iteration 4 as selected with cross-validation. In practical application, no test data is available when the system is developed. Thus, in the illustrated embodiment, the language and classification models of training iteration 4 are deployed as run-time models for the speech application 200 shown in FIG. 2.

In alternate embodiment, a conditional entropy H of the distributions of substitution and deletion errors made by the recognition component 206 is calculated by the testing component 292 to evaluate development improvement in step 268 of FIG. 4 and step 288 of FIG. 5. The condition entropy is provided by:

$$H = -\hat{\partial} P(w) \hat{\partial} P(v \mid w) \times \log P(v \mid w)$$

where P(w) is the error distribution over the reference vocabulary, and P(v|w) is the recognizer's confusion distribution for reference word w, which includes v=e for deletion errors.

The conditional entropy H is calculated for each iteration of Table IV as illustrated in Table V below.

TABLE V

| Iteration | Test CER | H |
|---|---|---|
| 1 (Set 1) | 5.58% | 1.839 |
| 2 (Set 2) | 5.24% | 1.780 |
| 3 (Set 1) | 5.03% | 1.750 |
| 4 (Set 2) | 4.92% | 1.748 |
| 5 (Set 1) | 4.92% | 1.748 |
| 6 (Set 2) | 4.81% | 1.731 |
| 7 (Set 1) | 5.25% | 1.739 |
| 8 (Set 2) | 5.14% | 1.739 |

As shown, in relation to the test CER of Table IV, the entropy H drops with drops in the classification error rate CER and thus the entropy calculation provides an evaluation or improvement criteria for step 266 of FIG. 4 and block 289 of FIG. 5 for deciding whether to pursue additional iterations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A training system including instructions stored on one or more computer storage devices and executable by a processing unit to implement components comprising:

a training component configured to receive training data including a plurality of training utterances and associated destination classes for the training utterances and the training component configured to invoke a speech recognition component to recognize the training utterances using an acoustic model stored on the one or more computer storage devices and a general language model stored on the one or more computer storage devices for a first training iteration and an iterative language model stored on the one or more computer storage devices for one or more subsequent training iterations and the recognition component outputting recognized text corresponding to the training utterances;

a language model training tool configured to process the output recognized text from the speech recognition component and adapt the general language model to provide the iterative language model for the one or more subsequent training iterations; and a classification model training tool configured to receive the output recognized text from the speech recognition component and generate a classification model based upon the recognized text from the training component and the associated destination classes for the training utterances corresponding to the recognized text.

2. The training system of claim 1 wherein the training component uses an unsupervised language model adaptation for the first training iteration and the one or more subsequent training iterations.

3. The training system of claim 1 wherein the training component includes instructions to perform repeat training iterations for one or more of a plurality of training data sets using the iterative language model from a previous training iteration.

4. The training system of claim 1 and comprising an interpolation component configured to process a domain-specific language model from the language model training tool to derive the iterative language model for the one or more subsequent iterations based upon an interpolation of one of the iterative language model or the general language model and the domain-specific language model generated by the language model training tool.

5. The training system of claim 1 and further comprising a testing component configured to receive the output recognized text from the speech recognition component and the associated destination classes corresponding to one or more sets of test utterances and output one or more of a classification error rate, word error rate or conditional entropy and the training component is configured to evaluate whether to perform additional training iterations based upon the classification error rate, the word error rate or the conditional entropy from the testing component.

6. The training system of claim 1 wherein the training component includes computer implementable instructions to recognize utterances in n-training data sets in the first training iteration and the one or more subsequent training iterations and uses n iterative language models to recognize utterances in the n-training data sets in the one or more subsequent iterations.

7. The training system of claim 1 wherein a classifier uses the classification model to provide an output routing classification associated with a call routing system.

8. A method implemented via computer readable instructions stored on one or more computer storage devices and executable via a processing unit comprising the steps of:
   recognizing speech utterances in one or more sets of training data in a first training iteration using an acoustic model and a general language model stored on the one or more computer storage devices;
   using the output recognition of the speech utterances in the one or more sets of training data to generate a first iterative language model adapted based upon language usage of the one or more sets of training data for the first training iteration;
   storing the first iterative language model on the one or more computer storage devices;
   recognizing the speech utterances in the one or more sets of training data in a first subsequent iteration using the first iterative language model;
   generating a second iterative language model adapted based upon the language usage of the one or more sets of training data for the first subsequent training iteration;
   storing the second iterative language model on the one or more computer storage devices; and
   re-recognizing the speech utterances in the one or more sets of training data in a second subsequent training iteration using the second iterative language model.

9. The method of claim 8 and further comprising the steps of:
   recognizing the speech utterances for n-training data sets using a general language model and generating n-iterative language models for the n-training data sets in the first training iteration; and
   repeating recognition of each n training data set of training data in one of the first or second subsequent training iterations using the n−1 iterative language models obtained with n−1 training data sets from previous training iterations.

10. The method of claim 8 and further comprising the step of:
    interpolating a domain-specific language model generated from the recognized text of the one or more sets of training data for the first training iteration and the general language model to create the iterative language model for one or more subsequent training iterations.

11. The method of claim 10 and further comprising the step of:
    interpolating between the iterative language model and the domain-specific language model generated from recognized text for the one or more subsequent iterations to generate the iterative language model for one or more additional subsequent training iterations.

12. The method of claim 8 and further comprising:
    generating a classification model using recognized text for the speech utterances in the one or more sets of training data for the one or more training iterations and associated class annotations for the speech utterances of the one or more sets of training data.

13. The method of claim 12 wherein the classification model is generated using a classification model training tool which receives the recognized texts for one or more of the training iterations.

14. The method of claim 12 and further comprising the steps of:
    testing classification or recognition of a development data set using one or more of the iterative language models and the classification model; and
    repeating the step of recognizing the speech utterances for the one or more sets of training data based upon classification or recognition improvement.

15. The method of claim 14 wherein the step of testing classification or recognition of the development data set includes the step of:
    calculating a word error rate or classification error rate for recognition or classification of the development data set.

16. The method of claim 14 wherein the step of testing classification or recognition comprises:
    calculating a conditional entropy for recognition of the development data set.

17. A system including instructions stored on one or more computer storage devices and executable by a processing unit to implement components comprising:
    a classification model training tool configured to train a classification model for classifying an input command and the classification model training tool using output text from a speech recognition component for input utterances from one or more sets of training data and associated classification annotations and the speech recognition component using an iterative language model for speech recognition which is generated from the one or more sets of training data using a language model training tool; and
    a testing component configured to invoke the speech recognition component to recognize one or more test utterances using the iterative language model generated from the one or more sets of training data and output a destination class for the output text from the speech recognition component using the classification model and the testing component compares the output designation class with a test classification for the one or more test utterances to calculate a classification error rate.

18. The system of claim 17 and comprising:
    a training component configured to invoke the speech recognition component to recognize the input utterances from the one or more sets of training data using the iterative language model and an acoustic model and output the text for the input utterances to the classification model training tool and the language model training tool.

19. The system of claim 18 wherein the language model training tool provides a domain specific language model to generate the iterative language model.

20. The system of claim 17 wherein a training component invokes the speech recognition component to recognize the input utterances from the one or more sets of training data during multiple training iterations.

21. The system of claim 20 wherein the training component uses the classification error rate to determine whether to perform additional training iterations.

* * * * *